May 28, 1946.　　　　J. C. THORESEN　　　　2,401,121
MEANS FOR CONSTRUCTING A FILTER BOTTOM
Filed Dec. 11, 1944　　　2 Sheets-Sheet 1

John C. Thoresen
INVENTOR

ATTORNEY

May 28, 1946.　　　　J. C. THORESEN　　　　2,401,121
MEANS FOR CONSTRUCTING A FILTER BOTTOM
Filed Dec. 11, 1944　　　2 Sheets-Sheet 2

John C. Thoresen
INVENTOR

BY
ATTORNEY

Patented May 28, 1946

2,401,121

UNITED STATES PATENT OFFICE 2,401,121

MEANS FOR CONSTRUCTING FILTER BOTTOMS

John C. Thoresen, Warwick, R. I., assignor to Builders Iron Foundry, Providence, R. I., a corporation of Rhode Island Application December 11, 1944, Serial No. 567,716

3 Claims. (Cl. 25—131.5)

This invention relates to a means for constructing a filter bottom.

For a number of years the advantages of the so-called "Wheeler" bottom for a filter have been appreciated. This bottom consists of a concrete floor—located above the filter box floor—having a series of pyramidal depressions uniformly spaced apart throughout the horizontal extent of the filter, with a hole through the bottom or apex of each depression. The latter is filled with selected sizes of round porcelain spheres, and above them are layers of gravel and filter sand. When in use, the water to be filtered is fed into the box above the sand and permitted to drain through the sand, gravel and the depressions in the Wheeler bottom, passing finally through the holes at the apexes into a space below from whence the now clean water is conducted to wherever it is to be used or stored.

In due course, as the filtered matter collects on and partly within the bed, it is necessary to wash it and this is accomplished by forcing wash water up through the holes and depressions of the Wheeler bottom and thence through the gravel and sand. This wash water picks up the foreign matter and carries it off through suitable troughs provided for that purpose. It is preferred to make the Wheeler bottom of concrete and it has heretofore involved the employment of considerable wood, in the forms of posts, beams and flooring, together with wedges for attempted leveling, all of which are below the Wheeler bottom after the concrete is poured and set. This wood must all be removed and in so doing it is usually rendered unfit for re-use and, what is more important, its removal is a difficult procedure for workmen who must crawl under the Wheeler bottom to dissemble the temporary planking and shoring on which the concrete was poured.

It is an object of the present invention to provide an improved means for constructing a so-called Wheeler bottom for a filter box. More especially it is an object of the invention to provide elements which can be readily placed in proper position in the filter box, securely held in place during the pouring and setting of the concrete bottom, and then easily removed by a workman outside the filter box for subsequent use in the formation of other Wheeler bottoms.

The best mode in which it has been contemplated to apply the principles of the present invention is shown in the accompanying drawings but these are to be deemed merely illustrative for it is intended that the patent shall cover by suitable expression in the appended claims whatever features of patentable novelty exists in the invention disclosed.

Figure 1:
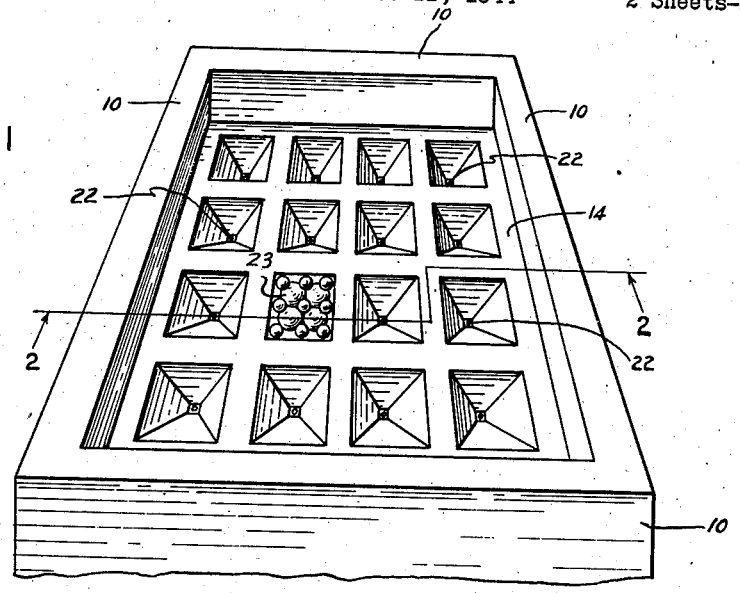
Fig. 1 is a perspective of a filter box having a "Wheeler" bottom constructed in accordance with the present invention.
Figure 2:
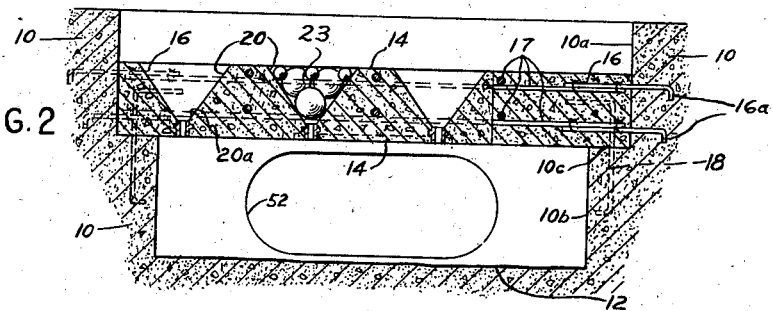
Fig. 2 is a vertical cross-section taken as on line 2—2 of Fig. 1.

Referring to the drawings and more especially to Figs. 1 and 2, there is shown a filter box having vertical side walls 10 and a base 12 formed of concrete. Intermediate of its extent each side wall is made with off-set portions 10a and 10b to provide, preferably all around the box, a horizontal shelf 10c which is to support a Wheeler bottom 14. When the walls are poured relatively short horizontal reinforcing rods 16 are carefully located and temporarily supported so that their hooked ends 16a will be firmly secured in the wall portions 10a above the shelf 10c, and with their straight ends extending into the space of the filter. Later, before the Wheeler bottom is poured, other rods 17 are wired to the straight ends of the rods 16, so as to extend across the form and be embedded in the concrete. Other L-shaped rods 18 are likewise positioned and temporarily supported so that their vertical legs will be embedded in the wall portion 10b below the shelf 10c with their horizontal legs projecting inward in direction away from the upper portion 10a of the side wall. After the concrete of the side walls is set, the temporary supports (not shown) for the horizontal and L-shaped tie rods are removed.

The Wheeler bottom is a concrete floor 14 constructed within the filter box with the edges of its bottom resting on the shelf 10c, with its side faces in intimate contact with and usually bonded to the upper portions 10a of the side walls, and with its body embracing the various tie rods 16, 17 and 18. At predetermined locations in the Wheeler bottom are pyramidal depressions 20 whose inverted apexes 20a are close by the lower surface of the bottom and from which a hole 22 extends through the concrete to the space between the Wheeler bottom and the base 12 of the box. These depressions are usually fitted with porcelain spheres 23 of several sizes so as to prevent any gravel working down into the voids between the spheres and to permit the upflow of wash water in a uniformly distributed manner without undue disturbance of the filter bed. The latter consists of graded layers of gravel resting on the concrete strips between the depressions and upon the spheres, and a bed of filter sand resting on the gravel. The spheres and material of the bed are so well known in the art that it is not deemed necessary to illustrate them in the drawings.

Figure 4:
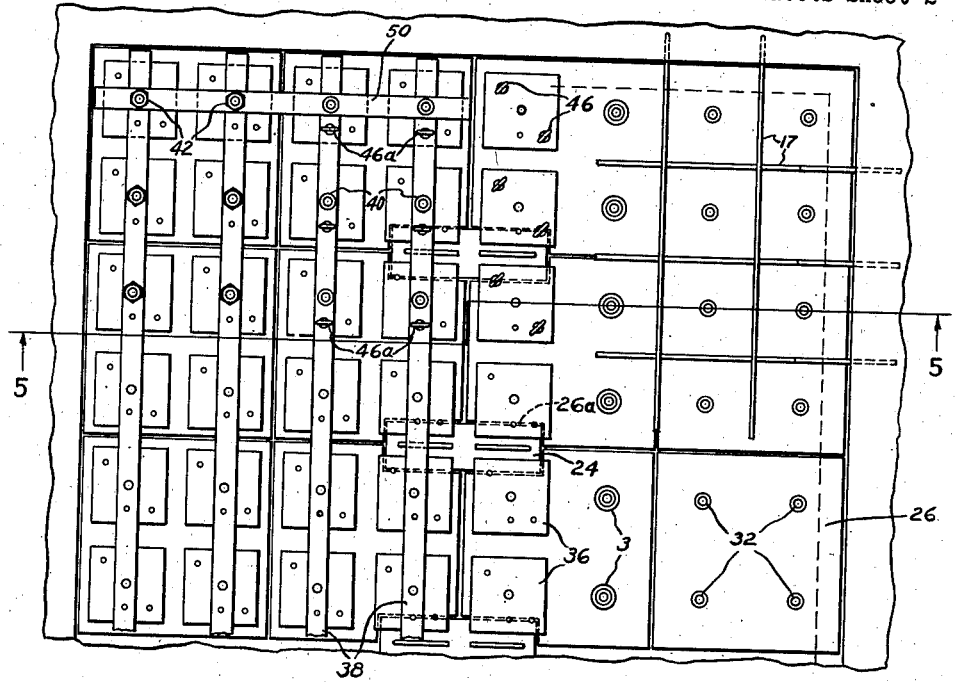
Fig. 4 is a plan view of a filter box and several form units in various stages of assembly.
Figure 5:
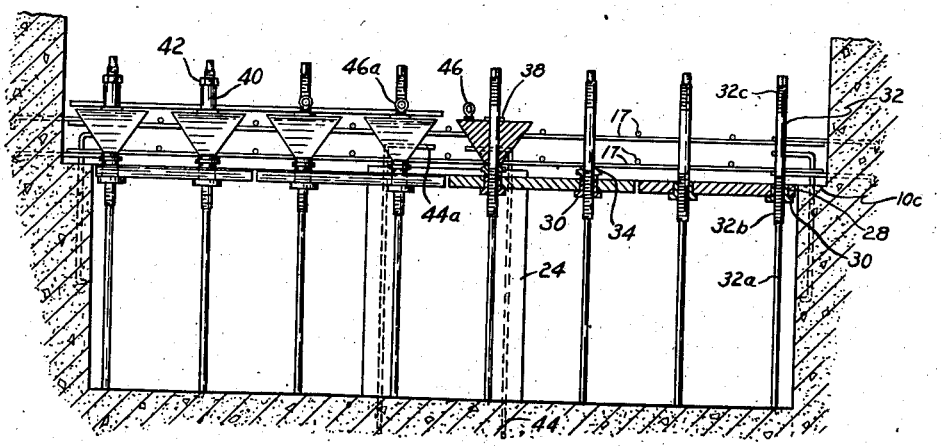
Fig. 5 is an elevation in section as on line 5—5 of Fig. 4.

The filter box shown in Figs. 1 and 2 is small enough to require no intermediate vertical supports or pillars for the Wheeler bottom, but where there is a greater distance between the side walls, concrete pillars are formed upstanding from the base of the box, as shown at 24 in Figs. 4 and 5.

The present invention has to do with an improved method and means for the construction of the Wheeler bottom. The method involves the use of a temporary form which can be readily removed and re-used for another bottom. The means comprises a new combination of elements whereby this method can be effectively practiced. The means as a whole embraces a number of what are herein termed form units. Each of these comprises a floor section 26 of wood, preferably ply-wood because it enables the requisite strength to be provided by a somewhat thinner section than does the ordinary integral wood readily available.

Preferably each section 26 is approximately two feet square, embracing an area of four square feet, but these dimensions and those that follow are not to be deemed limiting in any sense but merely illustrative of a practical embodiment of the invention. Four holes 28 (see Fig. 5) are bored through the section one foot apart and a half-foot from the edges. To the underside of the section are secured the flanges of metal bushings 30, which extend through the holes 28 to the top face of the section 26. Each bushing has a threaded hole through it.

A rod 32, hereinafter called a jackscrew, extends through a bushing 30, and has a smooth surfaced portion 32a of sufficient length to reach from the base 12 up to near what is to be the lower surface of the Wheeler bottom. At this point the rod is enlarged and threaded as at 32b to engage the threads in the hole of the bushing. Near its top end the rod is also threaded at 32c for a purpose to be presently disclosed. Its very top end may be flatted or squared to accommodate a wrench, but it is also practical to have the threads at 32b on the rod make a rather free engagement with the bushing so that in the assembly of the structure the rod can be turned by hand.

Figure 3:
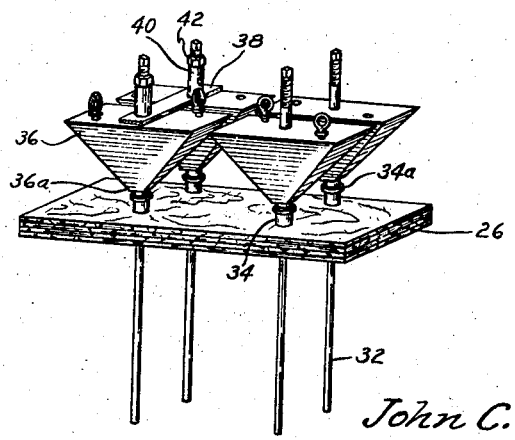
Fig. 3 is a perspective of a form unit assembly.

With the four rods screwed into the bushings, and with their portions upstanding above the section 26, a porcelain sleeve 34 (see Fig. 3) is slipped down around each rod to rest on the upper surface of the plywood. These sleeves or bushings remain in the Wheeler bottom and so are preferably provided with an annular flange 34a (see Fig. 3) to prevent their displacement in the concrete which subsequently surrounds them.

On each sleeve is rested the apex end 36a of a block 36 shaped like a pyramid. This has a central hole through which the rod 32 projects. As will later appear a positioning strap 38 is next slipped onto the rods, and then a distance sleeve or spacer 40 is dropped upon the strap. Finally a nut 42 is screwed on the rod at its upper threaded end and, when eventually tightened, the sleeve block and strap are firmly clamped to the plywood section.

In the filter box 10 of Figs. 1 and 2 four form units would be used, assuming that collectively they would take care of the area between the lower portions 10b of the side walls. If the filter box is of greater size, as shown in Figs. 4 and 5, then it is desirable to provide the pillars 24 of concrete, indicated in dotted outline in Fig. 2, and shown in full lines in Figs. 4 and 5 wherever the pillars are visible. Where these are used a portion of a section 26 is cut out as at 26a (Fig. 4) to accommodate a pillar, the upper surface of which is desirably formed at a level somewhat above the contemplated lower surface of the finished Wheeler bottom. Reinforcing rods 44 extend vertically upward through the pillars from within the concrete of the base 12 and are bent to provide horizontal arms 44a to be embedded in the Wheeler bottom at a slightly different level than are the tie rods 16 extending between the side walls.

In Figs. 4 and 5 are illustrated the successive stages or steps in the assembly of the form. In the lower right hand corner of Fig. 4 is seen a section 26 (the reinforcing rods being omitted for clearness of disclosure) with its four upstanding rods 32 threaded into the bushings secured to the lower face of the plywood. By turning these rods the upper surface of the sections 26 can be made level and in alignment with the shelf 10c of the side walls. Since each rod is individually adjustable it is evident that no great care need be exercised in making the floor or base of the filter box either smooth or level, for its unevenness can be readily overcome by adjusting the rods.

When thus leveled at the proper height so that the entire top surface—made up of the combined surfaces of each section—is level with the shelf 10c surrounding the box, the sleeves 34 are slipped over the rods, as shown in the right half side of the sections making up the second row from the right in Fig. 4. On the left half side of this same row, the pyramid blocks 36 are shown resting on the sleeves. On some of these blocks are also shown ring bolts 46 which may be screwed into the upper side of a block for convenience in lowering the block onto the sleeves and later in lifting it from the concrete.

In the two left hand rows in Fig. 4 there are shown the positioning straps or bars 38 extending in one direction from side wall to side wall, with holes therein at predetermined locations to receive and position the jackscrews so that the pyramid blocks may be held in place and properly distributed about the filter box. To insure that the blocks will not inadvertently rotate about a jackscrew, a ring dowel 46a is passed through a reamed hole in the strap and then into a reamed hole in the pyramidal form, thus locking the pyramidal form and strap temporarily together. In the uppermost row of Fig. 4 a similar strap 50 is shown extending between the other side walls. These cross straps may be provided at intervals. Above the straps are slipped the spacers 40 and above these the clamping nuts 42 are applied.

As thus assembled, the form is ready for the concrete and this is poured on the plywood and around the pyramid blocks up to the level of the top surface of the latter. Thus it embraces all the tie rods and bonds with the shelf and surface of the upper portion of the filter box.

When set the form may be readily removed as follows. The nuts 42, spacers 40 and straps 38, 50 are first removed. Then the blocks are lifted out of the concrete leaving the desired depressions terminating in the holes through the embedded sleeves 34 in the bottom. The jackscrews are then turned so that they are fed upward through the sleeves and as the threads 32b turn free from the sleeves the remainder 32a of the jackscrews can then be lifted through the holes.

When the rods are thus withdrawn the sections 26 will usually fall to the base or floor of the filter box, but in case of any adhesion between a section and the underservice of the concrete it can be broken by simply tapping on the top ends of the jackscrews after they have been turned outward and prior to their threads becoming entirely disengaged from the threads of the bushings 28. The sections 26 can then be reached by a rake or hooked-pole and drawn out from under the Wheeler floor through an access opening 52 (see Fig. 2) in the lower portion of a side wall.

Thus the invention provides for the setting up of a complete form for a Wheeler bottom in a very short time, with ease of adjustment that readily overcomes the unevenness of the filter box floor. Likewise, when the new bottom is set, the form can be quickly dismantled and removed. And the removal of the form sections from under the Wheeler bottom can be accomplished with ease.

I claim:

1. Means for constructing a filter bottom comprising separated floor sections each having a series of vertically disposed jackscrews extending from above the section to a fixed base below, internally threaded bushings on each section cooperating with the jackscrews for adjusting the section to a predetermined level; a form block surrounding a portion of each said jackscrew above a floor section; and means above the block cooperating with the jackscrews to clamp said blocks to the sections.

2. Means for constructing a filter bottom comprising a temporary floor composed of separate sections, each section having internally threaded holes therethrough, a jackscrew extending vertically from a fixed base and protruding through each hole and having external threads engaging the said hole threads whereby upon rotation of the jackscrew the section may be adjusted to a desired level; a depression making form, resting on said section and having a central hole through which the jackscrew extends; means cooperating with the jackscrew above said depression form to clamp the said form to the section; straps extending across the said forms; and doweling means between the straps and said forms to prevent rotation of the latter; all of said elements and means except the floor sections being subsequently removable from the filter bottom on the upper side thereof, and the floor sections being thereby rendered removable below said bottom.

3. A unit form for use in the construction of a filter bottom comprising a floor section having threaded holes therethrough, a jackscrew extending upward from a fixed base and protruding through each hole having external threads engaging the threads of the hole, a sleeve around each said jackscrew, a depression forming block resting on each sleeve having a central hole through which the jackscrew extends and a nut on each jackscrew above each said block; the said jackscrews being removable from the upper side of the filter bottom and the said floor section being removable from the under side of the filter bottom.

JOHN C. THORESEN.